(12) United States Patent
Feistel (10) Patent No.: US 9,133,933 B1
(45) Date of Patent: Sep. 15, 2015

(54) PISTON RING

(71) Applicant: BURCKHARDT COMPRESSION AG, Winterthur (CH)

(72) Inventor: Norbert Feistel, Ellikon a.d. Thur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 14/438,645

(22) PCT Filed: Oct. 28, 2013

(86) PCT No.: PCT/EP2013/072520
§ 371 (c)(1),
(2) Date: Apr. 27, 2015

(87) PCT Pub. No.: WO2014/064291
PCT Pub. Date: May 1, 2014

(30) Foreign Application Priority Data

Oct. 26, 2012 (EP) .................................... 12190280

(51) Int. Cl.
*F16J 9/00* (2006.01)
*F16J 9/18* (2006.01)
*F16J 9/26* (2006.01)
*F16J 9/28* (2006.01)

(52) U.S. Cl.
CPC .... *F16J 9/18* (2013.01); *F16J 9/26* (2013.01); *F16J 9/28* (2013.01)

(58) Field of Classification Search
CPC ................. F16J 9/00; F16J 9/12; F16J 9/14; F16J 9/16; F16J 9/18
See application file for complete search history.

(56) References Cited

U.S. PATENT DOCUMENTS

| 355,730 | A | * | 1/1887 | St. John | 277/494 |
| 1,419,781 | A | | 6/1922 | Trippensee | |
| 1,970,892 | A | * | 8/1934 | Kirn et al. | 277/446 |
| 1,999,466 | A | * | 4/1935 | Leonard | 277/494 |
| 2,670,255 | A | * | 2/1954 | Bergeron | 277/446 |
| 2003/0006562 | A1 | | 1/2003 | Feistel | |

FOREIGN PATENT DOCUMENTS

| DE | 20211694 | 1/2003 |
| EP | 1275888 | 1/2003 |
| GB | 129193 | 7/1919 |
| WO | 2007073684 | 7/2007 |

OTHER PUBLICATIONS

International Search Report for PCT/EP2013/072520, English translation attached to original, Both completed by the European Patent Office on Jan. 24, 2014, 7 Pages.

* cited by examiner

*Primary Examiner* — Gilbert Lee
(74) *Attorney, Agent, or Firm* — Brooks Kushman P.C.

(57) ABSTRACT

A piston ring for a reciprocating compressor is disclosed, including a one-part annular sealing ring with an arcuate outer surface and having a gap between butt ends of the sealing ring. A joint seal seals the gap symmetrical, having two limbs that extend at both sides in the peripheral direction over an angular range of 20° to 180° and having a radially outwardly directed, arcuate limb outer face. The joint seal includes a contact part that extends at both sides in the peripheral direction and projects beyond the limbs in the axial direction. The sealing ring and the joint seal are adapted to each other such that, when assembled, the joint seal rests laterally against the sealing ring via a stop and runs along the gap and covers same in the peripheral direction.

18 Claims, 5 Drawing Sheets

PISTON RING

CROSS-REFERENCE TO RELATED APPLICATION

This application is the U.S. national phase of PCT Application No. PCT/EP2013/072520 filed on Oct. 28, 2013, which claims priority to EP Patent Application No. 12190280.3 filed on Oct. 26, 2012, the disclosures of which are incorporated in their entirety by reference herein.

The invention relates to a piston ring according to the preamble of claim 1.

BACKGROUND OF THE INVENTION

For compressing fluids, such as gas or steam, dry-running reciprocating compressors are especially suitable. As piston sealing elements, piston rings consisting of plastic, for example one-piece piston rings with a straight cut joint or a scarf joint, are preferably used in such reciprocating compressors. One-piece piston rings of this type have the disadvantage that wear of the piston rings which occurs during operation of the reciprocating compressor leads to an enlargement of the distance between the two joint ends of the piston ring, which results in a reduction of the sealing action. Especially during the compression of light gases, such as hydrogen, this enlargement of the joint clearance results in a high leakage at the piston ring already occurring after a relatively short period of operation so that the piston rings already have to be replaced after a relatively short period of operation.

Printed document EP 1275888A1 discloses a piston ring—a so-called twin ring—which is capable of maintaining a certain sealing action even with progressive wear. This twin ring comprises a one-piece sealing ring with a straight cut joint, and comprises a one-piece L-shaped cover ring which covers the sealing ring in the axial and also radial direction. The circumference of the sealing ring and of the cover ring extends in each case over about 340 degrees so that wear compensation is carried out by means of an elastic bending. Such a twin ring has the disadvantage that the sealing action is reduced after a certain time. Moreover, there is the risk that such a twin ring breaks. Moreover, the production costs of such a twin ring are relatively high. Printed document GB129193A and U.S. Pat. No. 1,419,781 each disclose a piston ring. These piston rings have the disadvantage that their installation is difficult, that there is the risk of breakage, that they are relatively expensive to produce, and that they are not suitable for the sealing of high pressures.

SUMMARY OF THE INVENTION

It is the object of the invention to design a piston ring which is economically more advantageous.

This object is achieved with a piston ring having the features of claim 1. Dependent claims 2 to 18 relate to further advantageous embodiments.

The object is especially achieved with a piston ring for a reciprocating compressor, comprising a one-piece sealing ring which extends in a circumferential direction around a middle point with an axial direction and with an outer face extending in an arcuate manner, wherein the sealing ring has a straight cut joint with joint ends and also a gap extending between the joint ends in the circumferential direction D, and also comprising a joint lock for sealing the gap, wherein the joint lock is designed symmetrically with regard to a symmetry plane, wherein the joint lock, starting from the symmetry plane, has two leg sections extending on both sides in the circumferential direction, wherein the two joint-lock leg sections altogether extend over an angular range of between 20° and a maximum of 180°, and wherein the joint-lock leg sections have a radially outwardly oriented outer side extending in an arcuate manner, and wherein the joint lock, starting from the symmetry plane, has a contact section extending on both sides in the circumferential direction and projecting over the joint-lock leg sections in the axial direction, wherein the contact section extends in the circumferential direction only over a partial angle of the two joint-lock leg sections, and wherein the contact section has a radially outwardly oriented contact face, and wherein the contact face extends in a set back manner with regard to the outer side of the leg section in the radial direction so that the joint-lock leg sections lock to form an axially oriented stop along the contact face, wherein the sealing ring and the joint lock are of a mutually matched design in such a way that in the assembled state the joint lock butts laterally against the sealing ring via the stop, and that the contact face of the contact section extends along the gap and covers this in the circumferential direction. The symmetrical design of the joint lock has the advantage that symmetrical, or in the main symmetrical, forces occur in the region of the joint lock or of the gap of the sealing ring, which results in a particularly uniform material wear on the sealing ring so that the sealing action of the piston ring is ensured in the long term.

The piston ring according to the invention has the advantage that this has a sealing action which is independent of the wear of the piston ring. The piston ring according to the invention comprises a one-piece sealing ring and a joint with a gap, and comprises a joint lock which seals the joint or the gap of the sealing ring. The joint lock is displaceably mounted with regard to the sealing ring. The pressure difference which is applied across the piston ring results in a radially outwardly acting force bearing on the joint lock which results in the joint lock certainly being worn but in the lock joint being radially outwardly displaced on account of the radially outwardly acting force and of the wear so that the sealing action of the piston ring is maintained despite the wear. Known piston rings, however, have the disadvantage that the sealing action reduces on account of incomplete wear compensation.

The piston ring according to the invention also has the advantage that the sealing ring can have a full profile with uniform cross-sectional area in the circumferential direction over wide stretches, preferably with a square or rectangular cross section, wherein the axial width and the radial width of the sealing ring preferably correspond to the axial width and the radial width of the piston ring. In one advantageous embodiment, the sealing ring with full profile extends in the circumferential direction up to the joint lock. Depending on the selected length of the joint lock, which in the circumferential direction extends over an angular range of 20° to a maximum of 180°, depending on the embodiment, the sealing ring with full profile is preferably designed in such a way that this extends over the remaining angular range of 340° to 180° depending on the circumferential length of the joint lock. In contrast to piston rings which are known from the prior art, which consist of at least two sub-rings which are arranged to lie next to each other in the axial direction and extend in the circumferential direction, the piston ring according to the invention has a single sealing ring which has a full profile which extends over the entire axial width and the entire radial width of the piston ring, which results in a large cross-sectional area, and which inter alia results in the sealing ring being able to withstand relatively large pressure forces. In view of the fact that a requirement of piston rings is to withstand ever higher pressures, the sealing ring with full profile over the entire width is especially advantageous since this is capable of withstanding large forces.

The joint lock can extend over an angle in the range of between 20° and 180°. In one advantageous embodiment, the joint lock extends by an angular range of less than, or equal to, 120 degrees. From the prior art cited in the introduction, it is known that a piston ring consists of a sealing ring and a cover ring, wherein both the sealing ring and the cover ring extend over almost 360°. A cover ring, which extends over an angular range of more than 180 degrees, has the disadvantage that such a cover ring when being fitted onto a piston rod has to be opened out which involves the risk of a breakage failure occurring on the cover ring during its installation or during the subsequent operation. Such cover rings, moreover, are of a relatively stiff design, which additionally increases the risk of breakage during installation. The piston ring according to the invention with a joint lock, which extends over an angular range of less than, or up to, 180°, has the advantage that this does not have to be opened out when being fitted onto the piston rod and consequently possible damage during installation is excluded. Moreover, this joint lock has the advantage that two joint locks can be produced from a ring or a blank which extends over 360 degrees. A joint lock which extends to a maximum of 120 degrees has the advantage that three joint locks can be produced from a ring or a blank which extends over 360 degrees. Therefore, less material is required so that a joint lock and therefore also the entire piston ring can be produced more cost effectively. This is particularly advantageous when expensive materials such as PEEK are used for the joint lock.

The piston ring according to the invention has the advantage that this comprises a one-piece sealing ring, and also a joint lock butting against the sealing ring, wherein the joint lock is radially displaceable, and on account of the pressure difference being applied is pressed onto the sealing ring so that the piston ring according to the invention has high sealing power, low wear and is simple to install.

In one advantageous embodiment, the sealing ring is designed in such a way that on a section opposite the joint, which has high loading during operation on account of the occurrent bending, this sealing ring has a full profile over the entire axial width and the entire radial width or has an undiminished radial width or an undiminished cross section. The sealing ring with preferably full profile and with constant axial width and constant radial width advantageously extends over an angular range of 340° to 180°. In the two end leg sections of the sealing ring adjoining this, the radial width of the leg section or the cross-sectional area of the leg section advantageously reduces in the direction towards the two joint ends, preferably reducing continuously. As a result of the reduction of the cross section, the flexural rigidity is reduced in the region of these adjoining end leg sections and so enables improved wear compensation. The reduced flexural rigidity of the end leg sections also has the advantage that the sealing ring does not suffer any damage during installation and the short-term opening out of the sealing ring which is required in the process.

The sealing of the joint of the sealing ring is carried out both in the radial and in the axial direction by means of a preferably special L-shaped segment which is designed as the so-called joint lock.

The extent of this joint lock in the circumferential direction is at most equal to or less than 180 degrees so that wear compensation is carried out as a result of a radial displacement of the joint lock and not as a result of bending of the joint lock. The material properties of the joint lock, especially its elasticity, are therefore not important for the quality of wear compensation. Also, when the joint lock is being installed on the piston there is no risk of breakage since it is not bent for this purpose but is simply inserted into the groove. In an especially preferred embodiment, the piston ring consists of a relatively elastic sealing ring, wherein the sealing ring consists for example of a polymer such as PTFE, and a relatively stiff joint lock, wherein the joint lock consists for example of metal or PEEK. Such an embodiment has the advantage that the sealing ring, on account of its elastic properties, can be opened out without any problem during installation without there being a risk of breakage. The piston ring according to the invention can therefore be installed on a piston in a reliable and secure manner.

The piston ring as a dry-running or lubricated friction sealing element is especially suitable for the sealing of pistons which are moved in an oscillating manner.

The piston ring according to the invention is described in detail below based on exemplary embodiments.

BRIEF DESCRIPTION OF THE DRAWINGS

In the drawings used for explanation of the exemplary embodiments.

In the drawings, the same parts are basically provided with the same designations.

WAYS OF IMPLEMENTING THE INVENTION

Figure 1A:
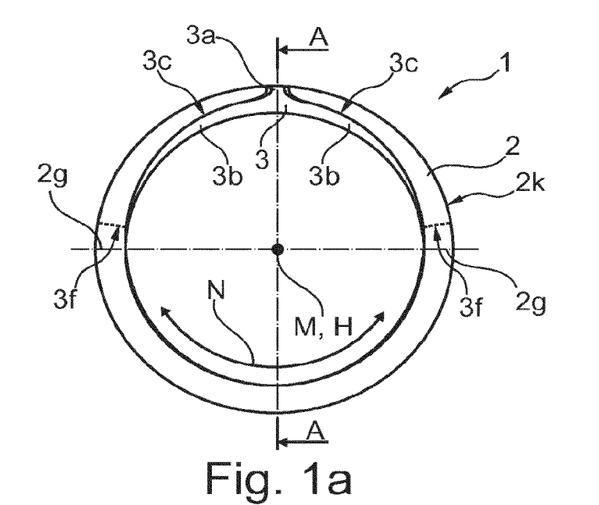
FIG. 1a shows a plan view of a piston ring.
Figure 1B:
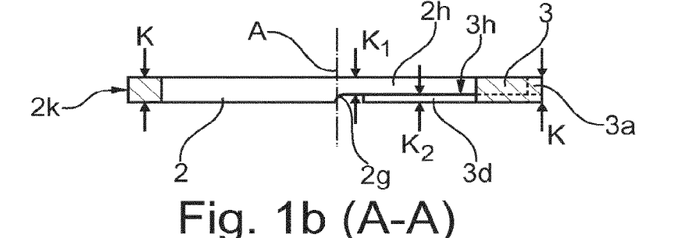
FIG. 1b shows a section through FIG. 1a along the line of intersection A-A.
Figure 2A:
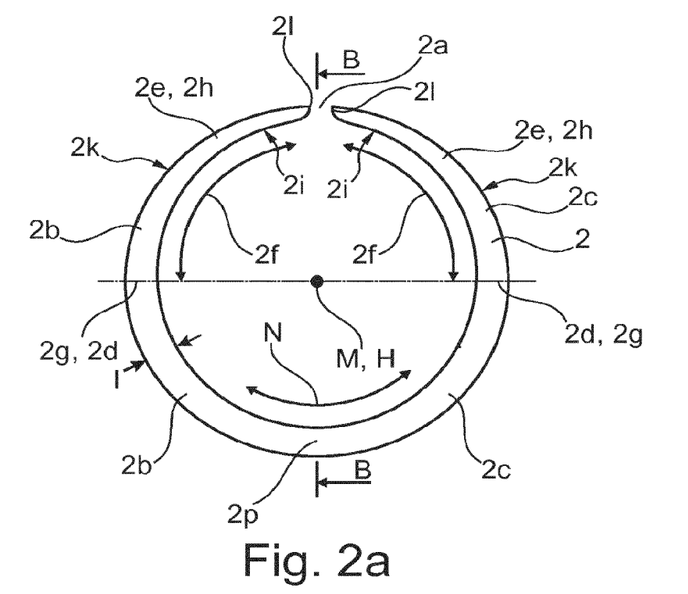
FIG. 2a shows a plan view of the sealing ring.
Figure 2B:
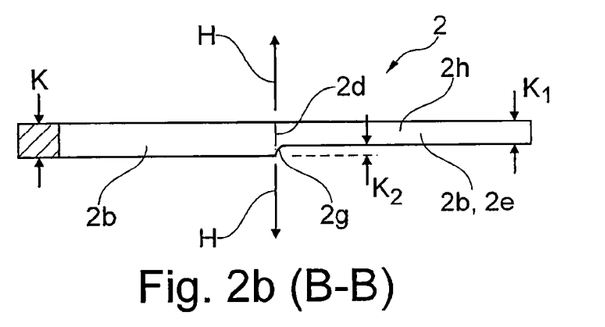
FIG. 2b shows a section through FIG. 2a along the line of intersection B-B.
Figure 3A:
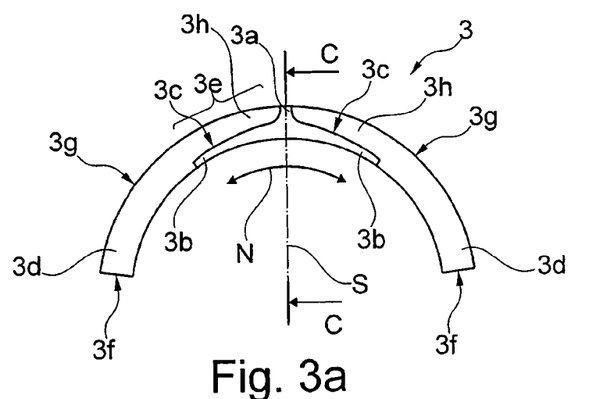
FIG. 3a shows a plan view of the joint lock.
Figure 3B:
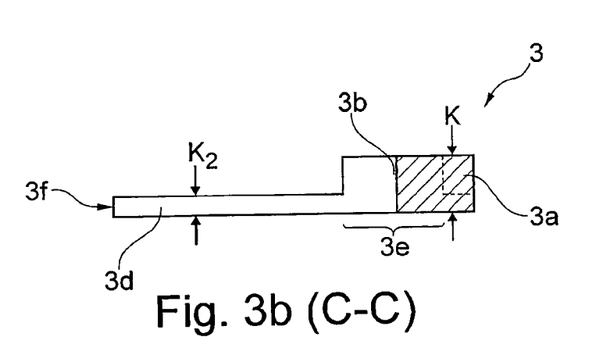
FIG. 3b shows a section through FIG. 3a along the line of intersection C-C.

FIG. 1a shows a piston ring 1 for a reciprocating compressor in plan view and FIG. 1b shows said piston ring in a section along the line of intersection A-A. The piston ring 1 comprises a sealing ring 2 and also a joint lock 3. FIG. 2a shows a plan view of the sealing ring 2 and FIG. 2b shows a section through the sealing ring 2 along the line of intersection B-B. FIG. 3a shows a plan view of the joint lock 3 and FIG. 3b shows a section through the joint lock 3 along the line of intersection C-C. The sealing ring 2 is designed in one piece and extends in the circumferential direction N around a middle point M with an axial direction H extending perpendicularly to the circumferential direction N. The sealing ring 2 has an outer face 2k extending in an arcuate manner, wherein the sealing ring 2 has a straight cut joint with joint ends 2*l*, and wherein a gap 2*a* extends between the joint ends 2*l* in the circumferential direction N. The joint lock 3 serves for the sealing of the gap 2*a*, wherein the joint lock 3 is of symmetrical design with regard to a symmetry plane S. The joint lock 3, starting from the symmetry plane S, has two leg sections 3*d* extending on both sides in the circumferential direction N, and wherein the two joint-lock leg sections 3*d* altogether can extend over an overall angular range of between a minimum of 20° and a maximum of 180° and, as shown in FIGS. 1*a* and 3*a*, preferably extend over an angle of less than 180°. The joint-lock leg sections 3*d* have a radially outwardly oriented outer side 3*g* extending in an arcuate manner, wherein the joint lock 3, starting from the symmetry plane S, has a contact section 3*b* extending on both sides in the circumferential direction N and projecting over the leg sections 3*d* in the axial direction H. The contact section 3*b* extends in the circumferential direction N only over a partial angle of the two joint-lock leg sections 3*d*, wherein the contact section 3*b* has a radially outwardly oriented contact face 3*c*, and wherein the contact face 3*c* extends in a set back manner in the radial direction with regard to the outer side 3*g* of the leg section so that the joint-lock leg sections 3*d* along the contact face 3*c* form a stop 3*h* which is oriented in the axial direction H. The sealing ring 2 and the joint lock 3 are of a mutually matched design in such a way that in the assembled state, as is evident from FIG. 1*a* and FIG. 1*b*, the joint lock 3 butts laterally against the sealing ring 2 via the stop 3*h* so that the contact face 3*c* of the contact section 3*b* extends inter alia along the gap 2*a* and covers this in the circumferential direction N.

Figure 4:
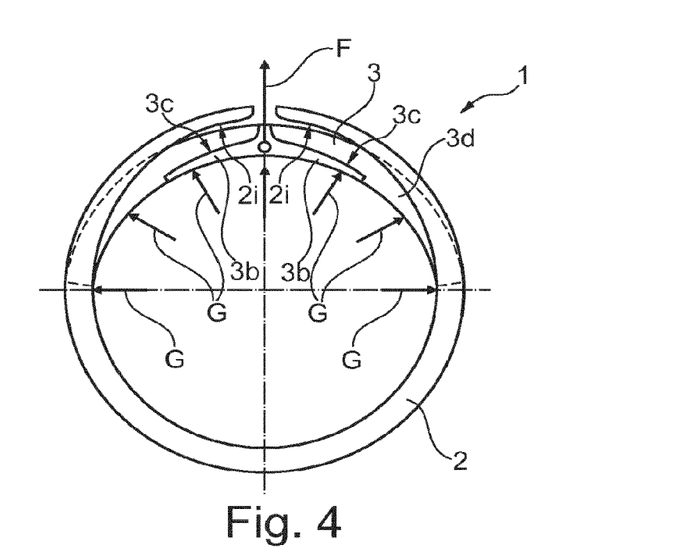
FIG. 4 shows a plan view of a piston ring and also the forces acting on the piston ring.

The sealing ring 2 and the joint lock 3 are advantageously of a mutually matched design in such a way that if the joint lock 3 butts against the inner side 2*i* of the sealing ring 2 the leg-section outer side 3*g* of the joint lock 3 and the outer face 2*k* of the sealing ring 2 extend congruently in the radial direction at least over a partial section of the circumferential direction N. In this case, a radially outwardly directed gas pressure G acts upon the joint lock 3, as shown in FIG. 4, during the operation of the reciprocating compressor which results in the joint lock 3 being pressed radially outward and therefore occupying the position shown in FIG. 1*a*. During the operation of the reciprocating compressor, the piston ring 1 experiences a degree of wear, that is to say during operation the radially outwardly oriented side 3*g* of the joint lock 3 and also at least a part of the outer circumferential face 2*k* of the sealing ring 2 experience a degree of wear. The outer circumferential face 2*k* experiences a degree of wear especially in the region of the tapering leg sections 2*e*. This results in the width of the gap 2*a* being increased in the circumferential direction N on account of wear during the operation of the reciprocating compressor. The gas pressure G acting upon the joint lock 3, which exerts a radially outwardly acting force upon the joint lock 3, results in the joint lock 3 also butting in a defined position against the gap 2*a*, and sealing this, as wear of sealing ring 2 and joint lock 3 increases. Therefore, the piston ring 1 according to the invention has reliable wear compensation and also a sealing action which is reliable in the long term.

The sealing ring 2, as shown in FIG. 1*a* and FIG. 2*a*, is advantageously designed in such a way that the sealing ring 2 consists of a first and a second leg section 2*b*, 2*c*, wherein the two leg sections 2*b*, 2*c* in the circumferential direction N taper towards the joint ends 2*l* along the tapering leg section 2*e* in the radial direction. The two leg sections 2*b*, 2*c* or the leg sections 2*e* advantageously taper along an angular range which extends up to the joint ends 2*l*, wherein this angular range, starting from the joint ends 2*l*, is for example 45° and a maximum of 90°.

In one advantageous embodiment, the joint lock 3, as shown in FIG. 1*a* and FIG. 3*a*, in the middle, in the region of the symmetry plane S, has a projecting lobe 3*a* which projects in the radial direction beyond the contact face 3*c*, wherein the lobe 3*a* in the circumferential direction N is designed to be as wide as the gap 2*a* or narrower than the gap 2*a*. The projecting lobe 3*a* advantageously extends up to the leg-section outer side 3*g*. In one advantageous embodiment, the joint lock 3 extends in the circumferential direction N over an angular range of at most 180°.

The sealing ring 2, as shown in FIGS. 1*b* and 2*b*, is advantageously designed in such a way that the sealing ring 2 consists of a first and a second leg section 2*b*, 2*c*, wherein each leg section 2*b*, 2*c* has a shoulder 2*g*, wherein the axial width K of the leg section 2*b*, 2*c* is reduced in the region of the shoulder 2*g* so that each leg section 2*b*, 2*c* has an end leg section 2*h* with reduced axial width K1 between the shoulder 2*g* and the joint end 2*l*.

As shown in FIGS. 1*a* and 2*a*, the sealing ring 2 in the circumferential direction N has a constant axial width K and a constant radial width I between the two shoulders 2*g* so that the sealing ring 2 along this section, as shown in FIG. 2*b*, has a full profile which is of rectangular or square design. The end leg sections 2*h* have a reduced axial width K1, wherein the joint-lock leg sections 3*d* also have an axial partial width K2, wherein the end leg sections 2*h* and the joint-lock leg sections 3*d* are arranged and designed in a mutually matched manner in such a way that their overall axial width corresponds to the axial width K of the sealing ring 2 between the two shoulders 2*g*. As a result, it is ensured that the piston ring 1 has a constant axial width K along its entire circumference.

As shown in FIG. 1*b*, the joint-lock leg section 3*d* preferably butts against the end leg section 2*h* via the stop 3*h*, wherein the reduced axial width K1 of the end leg section 2*h* and the axial partial width K2 of the joint-lock leg section 3*d* lock create an overall axial width which corresponds to the axial width K.

In one advantageous embodiment, both the end leg section 2*h* and the tapering leg section 2*e* begin at the same transition point, at the shoulder 2*g*, that is to say that the sealing ring 2 in the circumferential direction, beginning at the shoulder 2*g*, tapers along the leg section 2*e* in the radial direction and has the reduced axial width K1 in the axial direction. This transition point, however, does not have to be identical for the end leg section 2*h* and the tapering leg section 2*e* so the first and second leg sections 2*b*, 2*c* in the circumferential direction N could taper in the radial direction, for example even not until several angular degrees after the shoulder 2*g*, and in the process form the tapering leg section 2*f*.

As evident from FIG. 1*a*, the joint lock 3 in one advantageous embodiment has two contact sections 3*b* which have a reducing radial wall thickness in the direction towards the end of the contact sections 3*b*. Moreover, the sealing ring 2 is designed to extend in such a way that this, starting from the joint 2*l* in the circumferential direction, has a radially increasing wall thickness, wherein the wall thickness of joint lock 3 and sealing ring 2, as shown in FIG. 1*a*, advantageously extend in the radial direction in a mutually matched manner in such a way that the sum of the radial width of joint lock 3 and sealing ring 2 is constant so that the piston ring 1 in the circumferential direction advantageously has a constant radial width I.

Figure 6A:
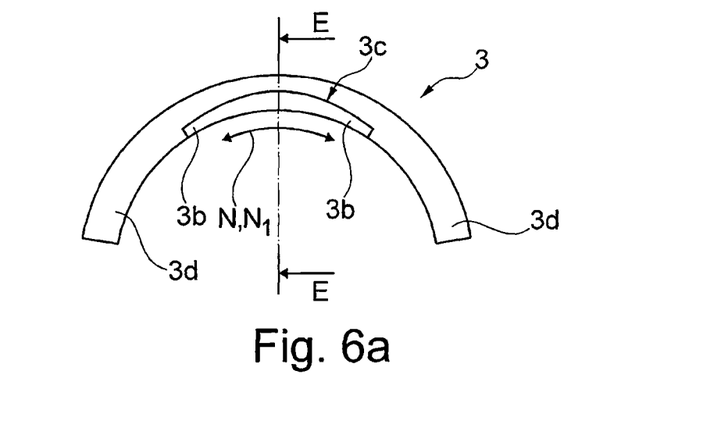
FIG. 6a shows a plan view of a further exemplary embodiment of a joint lock.
Figure 6B:
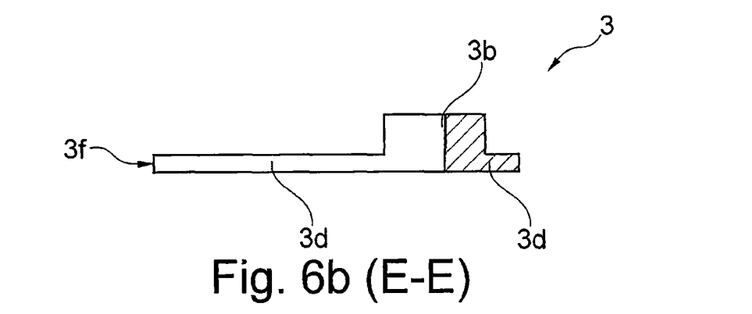
FIG. 6b shows a section through FIG. 6a along the line of intersection E-E.

FIGS. 6a and 6b show a further exemplary embodiment of a joint lock 3 which, in contrast to the exemplary embodiment shown in FIG. 3a, does not have a nose 3a.

In one advantageous embodiment, each leg section 2b, 2c, as shown in FIG. 2b, has a shoulder 2g, wherein the thickness of the axial width K of the leg section 2b, 2c in the axial direction H is reduced in the region of the shoulder 2g so that the leg section 2b, 2c has a reduced thickness or a reduced axial width K1 between the shoulder 2g and the joint end 2l.

In one advantageous embodiment, the sealing ring 2 and the joint lock 3, as shown in FIG. 1a, are of a mutually matched design in such a way that the two leg sections 3d of the joint lock 3 terminate in each case on one end face 3f, and that the end faces 3f and also the shoulders 2g are in a mutually arranged arrangement in such a way that the end faces 3f butt against the respective shoulder 2g if the joint lock 3 is inserted into the sealing ring 2. This results in the joint lock 3 occupying a defined position with regard to the sealing ring 2. This is especially advantageous if use is made of a joint lock 3 which, as shown in FIGS. 6a and 6b, does not have a projecting lobe 3a or nose 3a.

Figure 5A:
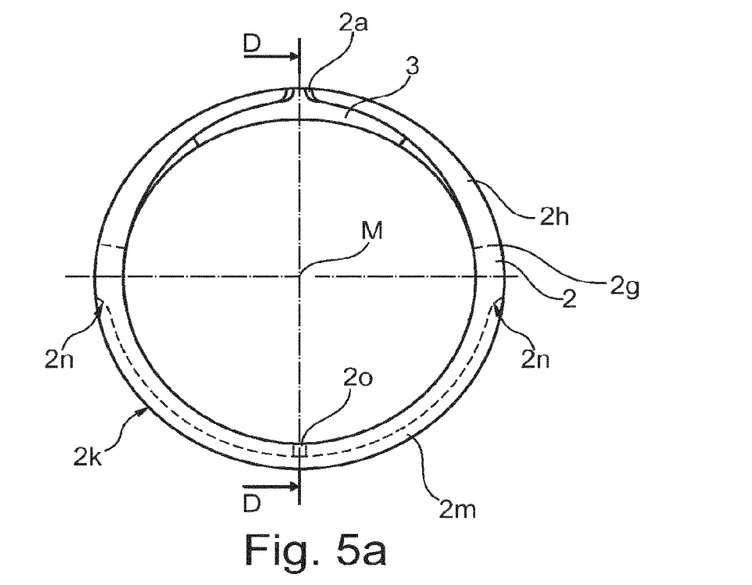
FIG. 5a shows a plan view of a further exemplary embodiment of a piston ring.
Figure 5B:
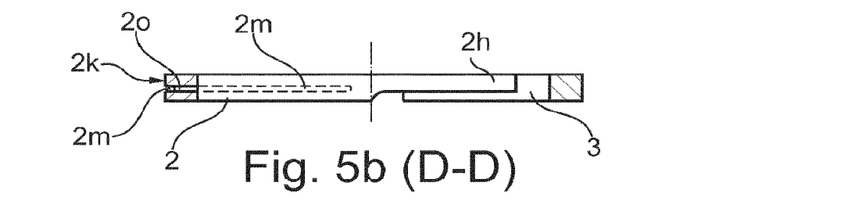
FIG. 5b shows a section through FIG. 5a along the line of intersection D-D.

In a further advantageous embodiment, the sealing ring 2, as shown in FIGS. 5a and 5b, has a pressure relief groove 2m on the outer circumferential face 2k extending in the circumferential direction N, wherein provision is also made for a bore 2o which forms a fluid conducting connection between the pressure relief groove 2m and the inner side of the sealing ring 2. The pressure relief groove 2m advantageously extends opposite and symmetrically to the gap 2a with regard to the middle point M. This embodiment is especially suitable for use in highly loaded sealing systems.

As shown in FIGS. 5a and 5b, the pressure relief groove 2m is of an advantageously wide design in such a way that the overall width of the outer circumferential face 2k along the pressure relief groove 2m corresponds in the main to the outer circumferential face 2k along the reduced axial width K1 of the end leg section 2h. This results in the outer circumferential face 2k having the same axial width along the pressure relief groove 2m and along the end leg section 2h. This results in the surface pressure with which the sealing ring 2 butts against the piston wall being equal or very similar in the circumferential direction so that at no point is the sealing ring 2 excessively loaded so that an equal degree of wear ensues. As shown in FIG. 5a, the beginning or the end 2n of the pressure relief groove 2m is arranged symmetrically to the shoulder 2g with regard to a horizontal line through the middle point M. This embodiment also results in increasingly symmetrical forces acting on the outer circumferential face 2k.

Figure 7:
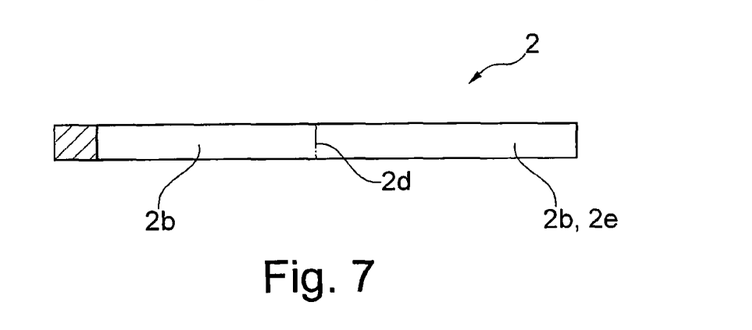
FIG. 7 shows a section through a further exemplary embodiment of a piston ring.

In a further possible embodiment, the sealing ring 2, as shown in FIG. 7 with a first leg section 2b, could have the same axial overall width K along the entire circumferential direction N. The leg section 2b could have the same radial width I over the entire circumferential direction N, or, as shown in FIG. 7, could have a tapering leg section 2e, with regard to the radial width, after the transition point 2d.

Figure 8A:
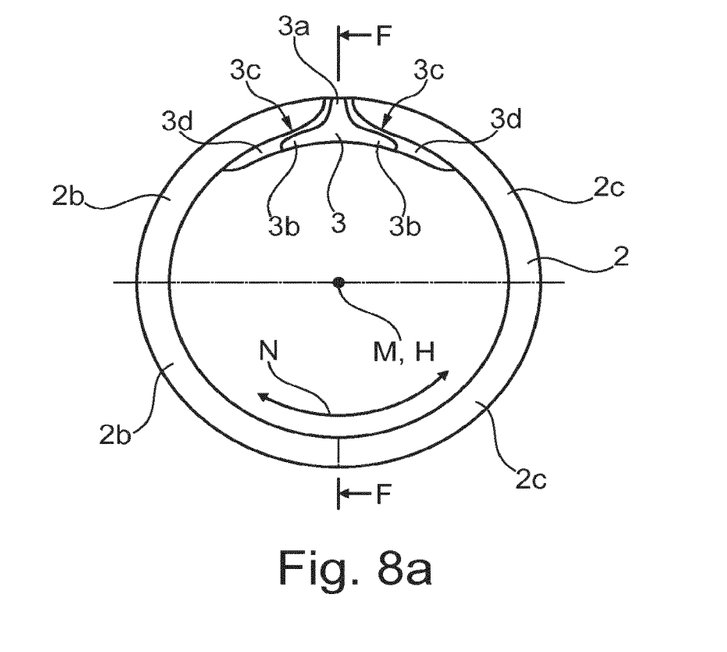
FIG. 8a shows a plan view through a further exemplary embodiment of a piston ring.
Figure 8B:
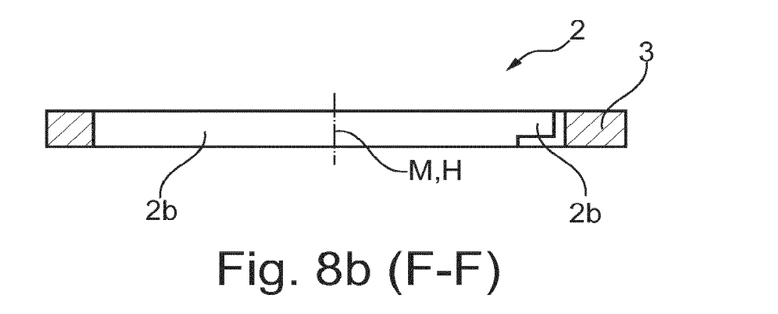
FIG. 8b shows a section through FIG. 8a along the line of intersection F-F.

In a further possible embodiment, the piston ring 1, as shown in FIGS. 8a and 8b, can be designed in such a way that the sealing ring 2 or its two leg sections 2b, 2c has, or have, a constant radial width I along the entire circumferential direction N in the radial direction, which only reduces right at the end in the region of the joint end 2l. In this exemplary embodiment, the radial width of the joint lock 3 is of a slightly wider design than the radial width I of the sealing ring 2 so that the joint lock 3 can accommodate the sealing ring 2, as shown above in FIG. 8a.

In one advantageous embodiment, the piston ring 1 or the sealing ring 2 and the joint lock 3 is produced from the same material. However, it can also prove to be advantageous to produce the sealing ring 2 and the joint lock 3 from different materials. As materials, for example PTFE, PEEK and/or modified PEEK are suitable. In one advantageous embodiment, the sealing ring is produced from a polymer such as PTFE whereas the joint lock is produced from PEEK. The piston ring according to the invention can be used both in dry running compressors and in lubricated compressors. As materials for dry running, for example filled PTFE, high-temperature polymers such as PEEK, polyimide, polyamidimide, epoxide or PFA are suitable. As materials in lubricated compressors, for example filled plastics and fiber composite materials, or for example metals such as gray iron or bronze, are suitable. For lubricated compressors, a hybrid solution of the piston ring would also be conceivable by the piston ring 2 consisting of a plastic such as PEEK or PTFE, and the joint lock 3 consisting of a metal such as bronze. With such a hybrid solution, a very good sealing action can be achieved. In a further advantageous embodiment, the piston ring 1 is designed in such a way that the sealing ring 2 and the joint lock 3 are produced from different materials, wherein the material of the sealing ring 2 preferably has a flexural elasticity modulus which is lower by at least 10% than the joint lock 3.

The piston ring 1 according to the invention can be arranged in a horizontal compressor in such a way that the joint lock 3 in the unpressurized state is not in contact with the cylinder barrel on account of the gravitational force. An activation of the joint lock is carried out as a result of a pressure difference being applied at the piston ring 1 which shifts the joint lock radially outward against the cylinder barrel in opposition to the gravitational force and therefore seals the abutment of the sealing ring 2.

The invention claimed is:

1. A piston ring for a reciprocating compressor, comprising a one-piece sealing ring, extending in a circumferential direction around a middle point with an axial direction, with an outer face extending in an arcuate manner, wherein the sealing ring has a straight cut joint with joint ends and also a gap extending in the circumferential direction between the joint ends, and also comprising a joint lock for sealing the gap, wherein the joint lock is designed symmetrically with regard to a symmetry plane, wherein the joint lock, starting from the symmetry plane, has two leg sections extending on both sides in the circumferential direction, wherein the two joint-lock leg sections altogether extend over an angular range of between 20° and a maximum of 180°, and wherein the joint-lock leg sections have a radially outwardly oriented outer side extending in an arcuate manner, and wherein the joint lock, starting from the symmetry plane, has a contact section extending on both sides in the circumferential direction and projecting in the axial direction over the joint-lock leg sections, wherein the contact section extends in the circumferential direction only over a partial angle of the two joint-lock leg sections, and wherein the contact section has a radially outwardly oriented contact face, and wherein the contact face extends in a set back manner in the radial direction with regard to the leg-section outer side so that the joint-lock leg sections along the contact face form a stop which is oriented in the axial direction, wherein the sealing ring and the joint lock are of a mutually matched design in such a way that in the assembled state the joint lock butts laterally against the sealing ring via the stop, and in such a way that the contact face of the contact section extends along the gap and covers this in the circumferential direction.

2. The piston ring as claimed in claim 1, wherein the sealing ring consists of a first and a second leg section, in that each leg section has a shoulder, wherein the axial width of the leg section is reduced in the region of the shoulder so that each leg section has an end leg section with reduced axial width between the shoulder and the joint end.

3. The piston ring as claimed in claim 2, wherein the sealing ring has a constant axial width and a constant radial width in the circumferential direction between the two shoulders, in that the end leg sections have a reduced axial width, in that the joint-lock leg sections have an axial partial width, and in that the end leg sections and the joint-lock leg sections are arranged and designed in a mutually matched manner in such a way that their axial overall width corresponds to the axial width of the sealing ring between the two shoulders.

4. The piston ring as claimed in claim 3, wherein the joint-lock leg section butts against the end leg section via the stop, and in that the reduced axial width of the end leg section and the axial partial width of the joint-lock leg section create an axial overall width which corresponds to the axial width.

5. The piston ring as claimed in claim 2, wherein the two leg sections of the joint lock terminate in each case on an end face, and in that the end faces and also the shoulders are in a mutually matched arrangement in such a way that the end faces butt against the respective shoulder if the joint lock is inserted into the sealing ring.

6. The piston ring as claimed in claim 1, wherein the sealing ring and the joint lock are of a mutually matched design in such a way that if the joint lock butts against the inner side of the sealing ring, the leg-section outer side of the joint lock and the outer face of the sealing ring extend congruently in the radial direction at least over a partial section of the circumferential direction.

7. The piston ring as claimed in claim 1, wherein the joint lock, in the middle, in the region of the symmetry plane, has a projecting lobe which projects in the radial direction beyond the contact face, wherein the lobe in the circumferential direction is designed to be as wide as the gap or narrower than the gap.

8. The piston ring as claimed in claim 7, wherein the projecting lobe extends up to the leg-section outer side.

9. The piston ring as claimed in claim 7, wherein the joint lock extends in the circumferential direction over an angular range of at most 120°.

10. The piston ring as claimed in claim 7, wherein the sealing ring consists of a first and a second leg section, wherein the two leg sections in the circumferential direction taper towards the joint ends in the radial direction.

11. The piston ring as claimed in claim 10, wherein the two leg sections taper along an angular range which extends up to the joint ends, and in that this angular range, starting from the joint ends, is at most 90°.

12. The piston ring as claimed in claim 1, wherein the two leg sections have a constant radial width along the entire circumferential direction.

13. The piston ring as claimed in claim 1, wherein the sealing ring on the outer circumferential face has a pressure relief groove extending in the circumferential direction.

14. The piston ring as claimed in claim 13, wherein the pressure relief groove extends opposite and symmetrically to the gap with regard to the middle point.

15. The piston ring as claimed in claim 1, wherein the sealing ring and the joint lock are produced from the same material.

16. The piston ring as claimed in claim 1, wherein the sealing ring and the joint lock are produced from different materials, wherein the material of the sealing ring has a flexural elasticity modulus which is at least 10% lower than the joint lock.

17. The piston ring as claimed in claim 16, wherein the sealing ring consists of metal, and in that the joint lock consists of plastic.

18. The piston ring as claimed in claim 16, wherein the sealing ring consists of a polymer, and in that the joint lock consists of PEEK.

* * * * *